(12) United States Patent
Nakadate

(10) Patent No.: US 8,498,779 B2
(45) Date of Patent: Jul. 30, 2013

(54) HEADLIGHT CONTROL APPARATUS FOR VEHICLES, AND HEADLIGHT SYSTEM FOR VEHICLES

(75) Inventor: Koichi Nakadate, Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 13/407,489

(22) Filed: Feb. 28, 2012

(65) Prior Publication Data

US 2012/0226412 A1 Sep. 6, 2012

(30) Foreign Application Priority Data

Mar. 2, 2011 (JP) ................. 2011-0452922

(51) Int. Cl.
*G06F 7/00* (2006.01)
*B60R 22/00* (2006.01)

(52) U.S. Cl.
USPC .................................. 701/36; 701/1; 701/49

(58) Field of Classification Search
USPC .............. 701/36, 49; 382/155, 104; 362/545, 362/516, 507, 494, 466, 459; 315/82, 83
See application file for complete search history.

(56) References Cited

U.S. PATENT DOCUMENTS

| | | | |
|---|---|---|---|
| 2003/0138132 A1* | 7/2003 | Stam et al. | 382/104 |
| 2004/0143380 A1* | 7/2004 | Stam et al. | 701/36 |
| 2005/0179391 A1* | 8/2005 | Ishigami et al. | 313/637 |
| 2006/0018511 A1* | 1/2006 | Stam et al. | 382/104 |
| 2006/0018512 A1* | 1/2006 | Stam et al. | 382/104 |
| 2008/0029701 A1* | 2/2008 | Onozawa et al. | 250/332 |
| 2008/0044062 A1* | 2/2008 | Stam et al. | 382/104 |

FOREIGN PATENT DOCUMENTS

| | | |
|---|---|---|
| EP | 2098775 A2 | 9/2009 |
| JP | 2009-211963 A | 9/2009 |
| JP | 2009-227088 A | 10/2009 |
| JP | 2009-298344 A | 12/2009 |

* cited by examiner

*Primary Examiner* — Ian Jen
(74) *Attorney, Agent, or Firm* — Chen Yoshimura LLP

(57) ABSTRACT

In controlling a vehicle headlight that has the ADB (Adaptive Driving Beam) function, low beams and high beams are appropriately controlled even when a vehicle ahead is making a turn. A vehicle headlight control device detects a turning motion in accordance with a change in an open angle of the vehicle ahead that can be obtained by monitoring lights of the vehicle ahead, and controls the headlight such that, before switched to high beams, the headlights continue a low-beam illumination for a prescribed delay time with respect to an area where the turning motion was detected immediately before the vehicle ahead went to a non-detected state. The vehicle headlight control device may be configured to determine the delay time based on an own vehicle speed and an open angle immediately before occurrence of the non-detected state.

8 Claims, 12 Drawing Sheets

(a)

(b)

(a)

(b)

(a)

| Distance between tail lamps | 1500 mm |
| Initial distance between vehicles | 20 m |
| Vehicle speed difference | 10 km/h |
| Vehicle speed | 30 km/h |

| Time lapse [s] | L[m] | $\alpha_{ID}$ [deg] |
| --- | --- | --- |
| 0.0 | 20.00 | 4.30 |
| 0.5 | 21.39 | 4.02 |
| 1.0 | 22.78 | 3.77 |
| 1.5 | 24.17 | 3.56 |
| 2.0 | 25.56 | 3.36 |
| 2.5 | 26.94 | 3.19 |
| 3.0 | 28.33 | 3.03 |
| 3.5 | 29.72 | 2.89 |
| 4.0 | 31.11 | 2.76 |
| 4.5 | 32.50 | 2.64 |
| 5.0 | 33.89 | 2.54 |

(b)

(c)

| Distance between tail lamps | 1500 mm |
| Initial distance between vehicles | 20 m |
| Vehicle speed difference | 10 km/h |
| Vehicle speed | 30 km/h |

| Time lapse [s] | L[m] | $\alpha_{ID}$ [deg] |
| --- | --- | --- |
| 0.0 | 20.00 | 4.30 |
| 0.5 | 18.61 | 4.46 |
| 1.0 | 17.22 | 4.32 |
| 1.5 | 15.83 | 3.84 |
| 2.0 | 14.44 | 2.97 |
| 2.5 | 13.06 | 1.70 |
| 3.0 | 11.67 | 0.00 |

(d)

(a)

(b)

(c)

(d)

(a)

(b)

(a)

(b)

HEADLIGHT CONTROL APPARATUS FOR VEHICLES, AND HEADLIGHT SYSTEM FOR VEHICLES

This application claims the benefit of Japanese Application No. 2011-0452922, filed in Japan on Mar. 2, 2011, which is hereby incorporated by reference in its entirety.

TECHNICAL FIELD

The present invention relates to a technology for controlling a vehicle headlight, and more particularly, to a technology for controlling a vehicle headlight that has an ADB function (Adaptive Driving Beam), which automatically adjusts a distribution of light in accordance with presence of a vehicle ahead.

BACKGROUND ART

Headlights for a vehicle can produce high beams and low beams interchangeably. The high beams cast high-intensity light over a greater distance, and the low beams illuminate a closer area with a prescribed light intensity. The high beams can provide better visibility, but they may produce glare that affects drivers of vehicles ahead such as preceding or oncoming vehicles.

In order to prevent the glare, some vehicle headlights are provided with the ADB function. The vehicle headlights having the ADB function are configured such that, upon high beam illumination, a position of a vehicle ahead is identified, and in accordance with dimensions and the position of the vehicle, a "shadow (cut-off)" for suppressing the glare to the vehicle ahead is produced in the illumination area, thereby reducing the glare toward a driver of the vehicle ahead. The cut-off is produced by placing a mask (shade) that has dimensions and a position corresponding to those of the vehicle ahead on an image forming device (projector).

In this scheme, by using a mask that can change its shape, the dimensions and the position of the cut-off can be controlled in accordance with a movement of the vehicle ahead (see Patent Document 1 and Patent Document 2, for example). Also, in a scheme to provide the ADB function (ADB system), lights from tail lamps, headlights, or the like of a vehicle ahead are detected from an image of a preceding area captured by a recognition camera provided in a car interior room, and a position of the vehicle is thereby identified (see Patent Document 3, for example).

RELATED ART DOCUMENTS

Patent Documents

Patent Document 1: Japanese Patent Application Laid-Open Publication No. 2009-211963
Patent Document 2: Japanese Patent Application Laid-Open Publication No. 2009-227088
Patent Document 3: Japanese Patent Application Laid-Open Publication No. 2009-298344

SUMMARY OF THE INVENTION

Problems to be Solved by the Invention

As described above, because the vehicle ahead is detected through the lights thereof, when the vehicle ahead is in a certain state, even though the vehicle is present within an illumination area of the headlights, the presence thereof may not be detected, causing the headlight to be switched to the high beams. When the vehicle ahead is making a turn such as a right turn or a left turn, for example, its lights turn sideways, and therefore cannot be detected from an image captured by the recognition camera. This causes the vehicle ahead not to be detected, switching the headlights to the high beams. However, the vehicle ahead may be present in the illumination area of the headlights at this time, and in this case, glare is caused to the driver of the vehicle ahead.

The present invention was made in view of such circumstances, and an object of the present invention is to provide, in a headlight control for a vehicle that has the ADB function, a technology that allows for an appropriate light distribution control such as low beams and high beams even when a vehicle ahead is making a turn.

Means for Solving the Problems

According to the present invention, the control unit detects a turning motion based on a change in an open angle of a vehicle ahead, which can be obtained by monitoring lights of the vehicle ahead, and controls headlights such that an area where the turning motion was detected immediately before the vehicle ahead went to a non-detected state is continuously illuminated with low beams for a prescribed delay time before the headlights are switched to high beams.

Specifically, provided is a vehicle headlight control device that detects a vehicle ahead in a preceding area of an own vehicle at prescribed intervals through a recognition camera and that controls a light distribution of a vehicle headlight in accordance with a detection result, the vehicle headlight control device including a vehicle identification unit that identifies a detected vehicle ahead upon detection of the vehicle ahead, a turning detection unit that detects a turning motion of each identified vehicle ahead, and a light distribution control unit that generates a light distribution control signal for controlling the light distribution of the vehicle headlight, wherein the light distribution control unit generates the light distribution control signal for controlling the vehicle headlights such that a low-beam illumination is performed to an area where the vehicle ahead is detected and a high-beam illumination is performed to a non-detection area, and such that the low-beam illumination continues for a prescribed delay time with respect to an area where the turning motion of the vehicle ahead was detected immediately before the vehicle ahead turned into a non-detected state, even if that area is the non-detection area.

Also, the present invention provides a vehicle headlight control system including the above-mentioned vehicle headlight control device, and a vehicle headlight that generates a light distribution in accordance with control by the vehicle headlight control system.

Effects of the Invention

According to the present invention, in controlling vehicle headlights that have the ADB function, a control for a light distribution such as low beams and high beams can be appropriately performed even when a vehicle ahead is making a turn.

DETAILED DESCRIPTION OF EMBODIMENTS

Embodiment 1

Figure 1:
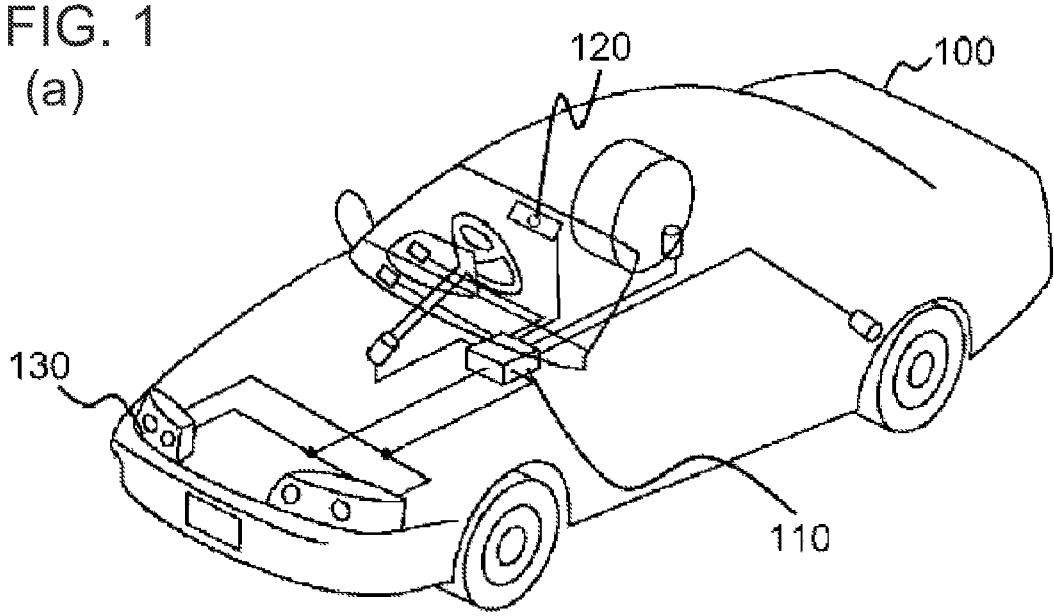
FIG. 1(a) is an explanatory diagram for a configuration of a vehicle headlight control system for a vehicle of Embodiment 1.
FIG. 1(b) is an explanatory diagram for a configuration of a vehicle headlight control system of an ECU of Embodiment 1.
Figure 1:
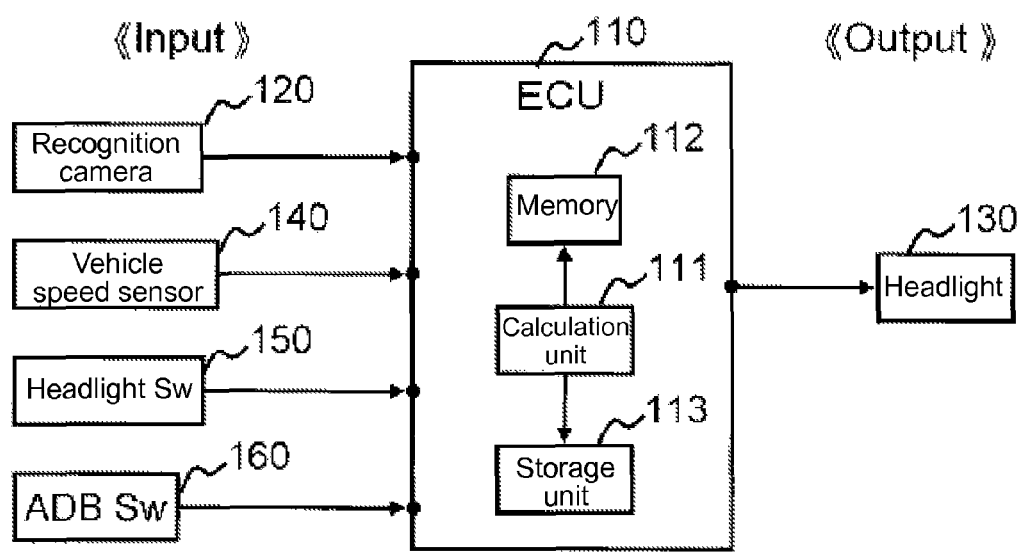

Below, Embodiment 1 of the present invention will be explained. In the following figures provided to explain embodiments of the present invention, same reference characters are given to members and portions that have the same functions, and explanations thereof will be repeated.

FIG. 1(a) is a diagram illustrating a configuration for a vehicle headlight control system in a vehicle 100 equipped with a vehicle headlight control system according to this embodiment. As shown in the figure, the vehicle of this embodiment includes an ECU (Electronic Control Unit) 110 that performs an electrical control of the vehicle 100, a recognition camera 120 that captures an image of a preceding area of the vehicle 100, and headlights 130 that illuminate a preceding area of the vehicle 100. The recognition camera 120 and the headlights 130 are connected to the ECU 110.

The recognition camera 120 is placed at a position that allows the camera to capture an image of a preceding area including a preceding vehicle, an oncoming vehicle, and the like in front of the vehicle 100—on a glass surface behind a rearview minor, for example. The recognition camera 120 captures an image of a preceding area at prescribed time intervals (Δt, for example) for detecting a vehicle ahead. The detection of the vehicle ahead can be performed through a known technology such as detecting lights of the vehicle ahead. The detection result is output to the ECU 110 together with information of a capture time "t." When the detection result shows that vehicles are present ahead, vehicle ahead positional information for each of these vehicles ahead is output, and when no vehicle is detected, vehicle ahead non-detection information indicative of absence of a vehicle is output. The vehicle ahead positional information that is output here is the angles formed by the two lights of each of the vehicles relative to the vehicle 100—that is, the open angle α.

The headlights 130 are equipped with the ADB function for adjusting a light distribution in various manners in accordance with a positional relationship between the vehicle 100 and a vehicle ahead such as an oncoming vehicle or a preceding vehicle. The light distribution is controlled by a light distribution control signal from the ECU 110.

The ECU 110 serves as a vehicle headlight control unit that analyzes the vehicle ahead information sent from the recognition camera 120, generates a light distribution control signal, and outputs the light distribution control signal to the headlights 130. As shown in FIG. 1(b), the ECU 110 is provided with a calculation unit 111 made of a CPU, a memory 112, and a storage unit 113, and the CPU (calculation unit) 111 loads programs stored in the storage unit 113 to the memory and executes them so that the ECU 110 performs the functions of the vehicle headlight control unit. In this embodiment, the ECU 110 serves as the vehicle headlight control unit by utilizing inputs from the recognition camera 120, a vehicle speed sensor 140, a headlight switch 150, and an ADB (Adaptive Driving Beam) switch 160.

Next, a vehicle headlight control unit 200 of this embodiment will be explained. The vehicle headlight control unit 200 analyzes the vehicle ahead information sent from the recognition camera 120, and controls the headlights 130 so as to illuminate an area in which no vehicle was detected with high beams and an area in which a vehicle was detected with low beams. Here, the vehicle headlight control unit 200 also determines whether a vehicle ahead is making a turn, and even if no vehicle is detected in a certain area, if a vehicle in the area was making a turn immediately before the vehicle went to a non-detected state from a detected state, the vehicle headlight control unit 200 controls the headlights so as to continue a low-beam illumination to that area for a prescribed period of time (delay time) before starting a high-beam illumination.

Figure 2:
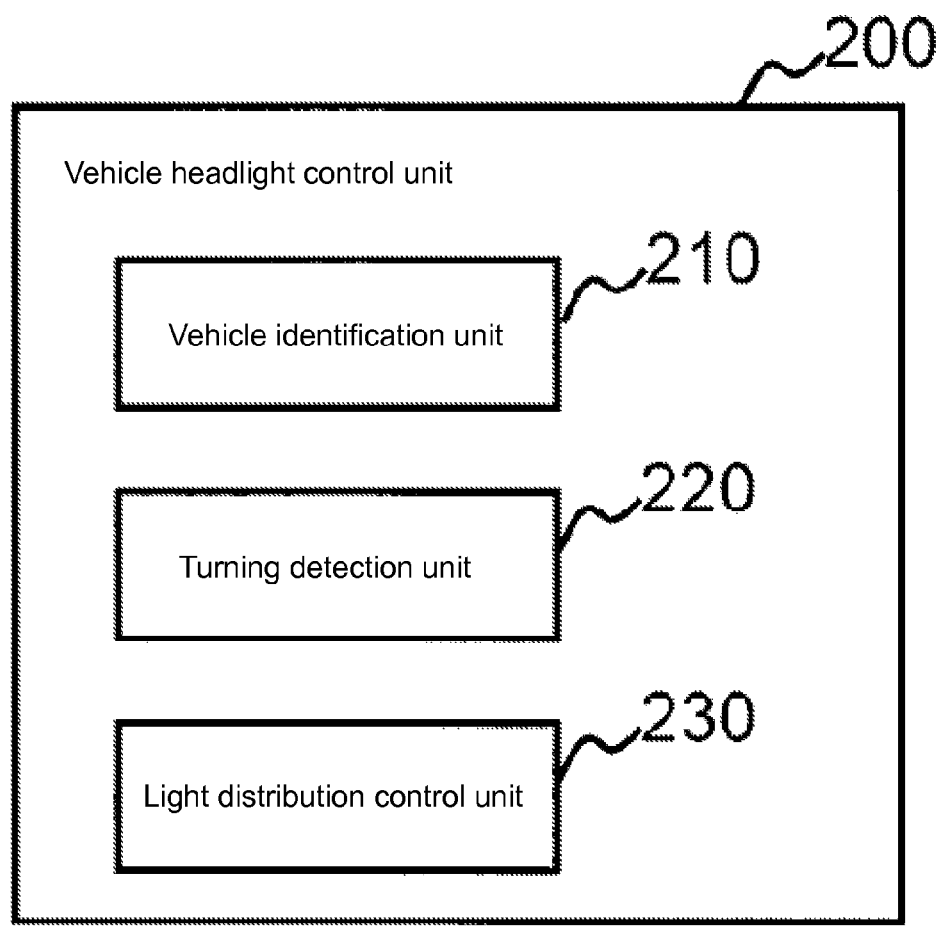
FIG. 2 is a function block diagram of a vehicle headlight control unit of Embodiment 1.

FIG. 2 is a function block diagram of the vehicle headlight control unit 200 of this embodiment. In order to achieve the above-mentioned function, the vehicle headlight control unit 200 is provided with a vehicle identification unit 210, a turning detection unit 220, and a light distribution control unit 230.

When vehicle ahead information, which is sent from the recognition camera 120 at Δt intervals, is vehicle ahead positional information for the respective vehicles ahead, the vehicle identification unit 210 provides each vehicle ahead positional information with identification information (ID) for identifying each vehicle ahead. The ID for the positional information for each vehicle ahead is determined by comparing the positional information with the previous vehicle ahead information that was received Δt ago. If a difference between the angle of the current positional information and the angle of the previous positional information is within a prescribed range, for example, it is determined that these two pieces of vehicle ahead positional information are attributed to the same vehicle, and therefore, the same ID is provided. When vehicle ahead positional information does not match any of the vehicle ahead positional information that was received Δt ago, the positional information is assigned with a new ID. The vehicle identification unit 210 outputs the vehicle ahead positional information assigned with IDs to the turning detection unit 220 and to the light distribution control unit 230.

The turning detection unit 220 performs a turning detection process for detecting a turning motion of a vehicle ahead based on the vehicle ahead positional information assigned with IDs. The turning detection process is performed for each detected vehicle ahead (for each ID). When a turning motion of a vehicle having a certain ID is detected, the turning detection unit 220 enables a turning flag FID (FID=1) in the ID, and initializes a delay time counter TID (TID=0) that counts a delay time DT for the ID. The delay time DT and the turning detection process will be later described in detail.

Receiving the vehicle ahead information, the light distribution control unit 230 performs a light distribution control signal generation process for generating a light distribution control signal, and outputs the generated light distribution control signal to the headlights 130 at the Δt intervals. In this embodiment, as the vehicle ahead information, the vehicle ahead positional information assigned with IDs is provided by the vehicle identification unit 210, and vehicle ahead non-detection information is provided by the recognition camera 120. The light distribution control signal is generated in accordance with this vehicle ahead information and the respective states of the turning flag FID and the delay time counter TID, which are controlled by the turning detection unit 220. In this embodiment, the headlights 130 are controlled such that an area in which the vehicle ahead was detected is illuminated with low beams and a non-detection area is illuminated with high beams, but when it is determined that a vehicle ahead was making a turn immediately before it went to the non-detected state, that area is continuously illuminated with low beams over the prescribed delay time, even if it is a non-detection area. The light distribution control signal generation process will be later described in detail.

Next, the turning detection process by the turning detection unit 220 of this embodiment will be explained. The turning detection unit 220 performs the turning detection process every time the vehicle ahead positional information assigned with IDs is sent from the vehicle identification unit 210, and controls the status of the turning flag FID and the delay time DT counter TID.

Every time the vehicle ahead positional information assigned with IDs is received, the turning detection unit 220 of this embodiment determines presence or absence of a turning motion based on an amount of change $\Delta\alpha ID$ in the open angle $\alpha ID$ over the period of $\Delta t$ for respective IDs (vehicles ahead). When turning motions are detected, the turning flag FID is enabled for the respective IDs, and the counter TID of the delay time DT is initialized for the respective IDs. The presence or absence of the turning motion is determined based on the following principle.

Figure 3:
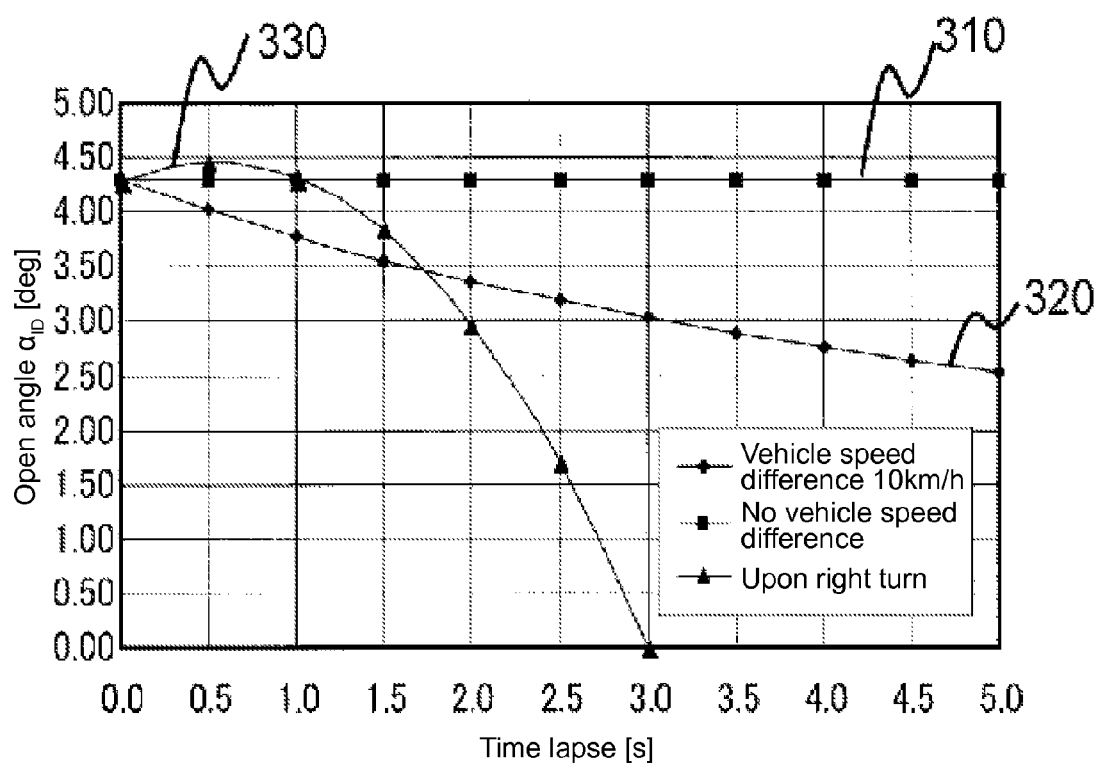
FIG. 3 is a graph illustrating a temporal change in an open angle in Embodiment 1.

When a vehicle ahead is a preceding vehicle, and the preceding vehicle is driving at substantially the same speed as that of the vehicle 100, the distance between the two vehicles is kept constant, and the open angle $\alpha ID$ (deg) does not change almost at all with time as shown in a graph 310 in FIG. 3.

Figure 4:
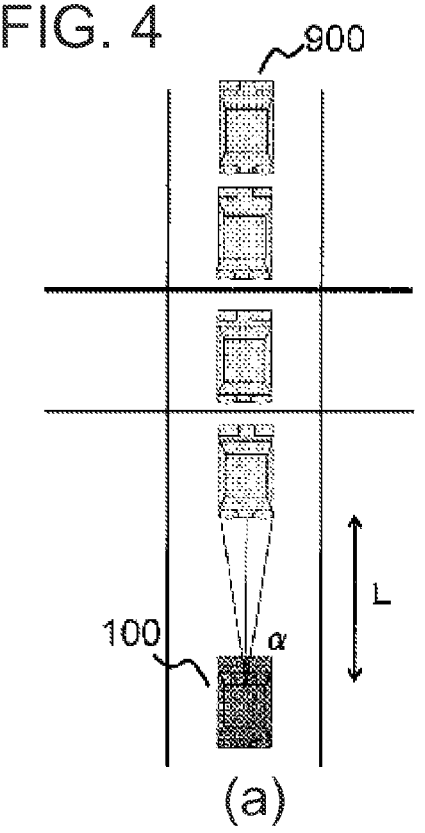
FIGS. 4(a) to 4(d) are explanatory diagrams for illustrating a temporal change in the open angle of Embodiment 1.
Figure 4:
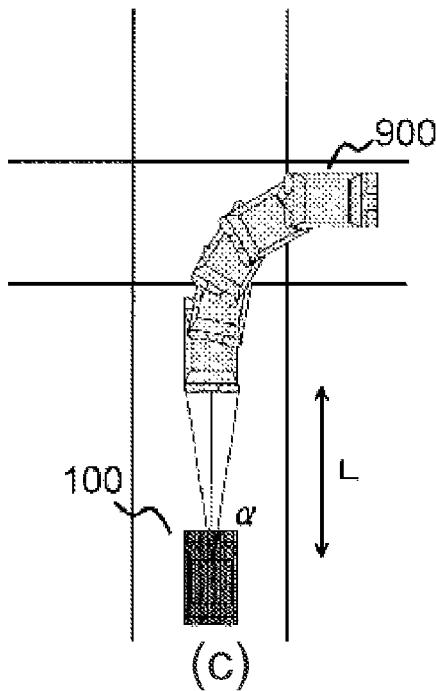

On the other hand, when a vehicle ahead is a preceding vehicle that is travelling at a different speed from that of the vehicle 100, or when a vehicle ahead is an oncoming vehicle, the open angle $\alpha ID$ (deg) gradually increases or decreases. As shown in FIG. 4(*a*), when a vehicle ahead 900 is travelling at a speed that is different from that of the vehicle 100 by 10 km/h, for example, a distance L(m) between the vehicle ahead 900 and the vehicle 100 and the open angle $\alpha ID$ (deg) are changed at every 0.5 seconds as shown in FIG. 4(*b*). The change in the open angle $\alpha ID$ (deg) in this case is illustrated with a graph 320 in FIG. 3. The distance between two tail lamps of the vehicle ahead 900 was set to 1500 mm, the initial distance between the two vehicles was set to 20 m, and the vehicle speed of the vehicle 100 was set to 30 km/h.

On the other hand, when a preceding vehicle makes a turn such as a left turn, a right turn, or the like, the open angle $\alpha ID$ (deg) is rapidly decreased as shown in a graph 330 in FIG. 3 regardless of the speed of the preceding vehicle. As shown in FIG. 4(*c*), when the vehicle ahead 900 makes a right turn, for example, the distance L(m) between the vehicle ahead 900 and the vehicle 100 and the open angle $\alpha ID$ (deg) are changed every 0.5 seconds as shown in FIG. 4(*d*). The change in the open angle $\alpha ID$ (deg) in this case is illustrated with the graph 330 in FIG. 3. The distance between two tail lamps of the vehicle ahead 900 was set to 1500 mm, the initial distance between the two vehicles was set to 20 m, and the vehicle speed of the vehicle 100 was set to 30 km/h.

As described above, the amount of temporal change $\Delta\alpha ID$ in the open angle $\alpha ID$ in the case where the vehicle makes a turn differs from that of other cases, that is, the amount of temporal change $\Delta\alpha ID$ in the open angle $\alpha ID$ becomes greater when the vehicle makes a turn as compared with other cases.

The turning detection unit 220 of this embodiment utilizes this characteristic, and when the change in the open angle $\alpha ID$ over a prescribed period of time ($\Delta t$) is equal to or greater than a prescribed threshold Th1 (turning threshold), the turning detection unit 220 determines that the vehicle ahead 900 is making a turn. When it is determined that the vehicle ahead 900 is making a turn, the turning flag FID (FID=1) is enabled, and the counter TID of the delay time DT is initialized. The turning threshold Th1 is set to 0.5 degrees when Δt is set to 0.5 sec, for example.

Figure 5:
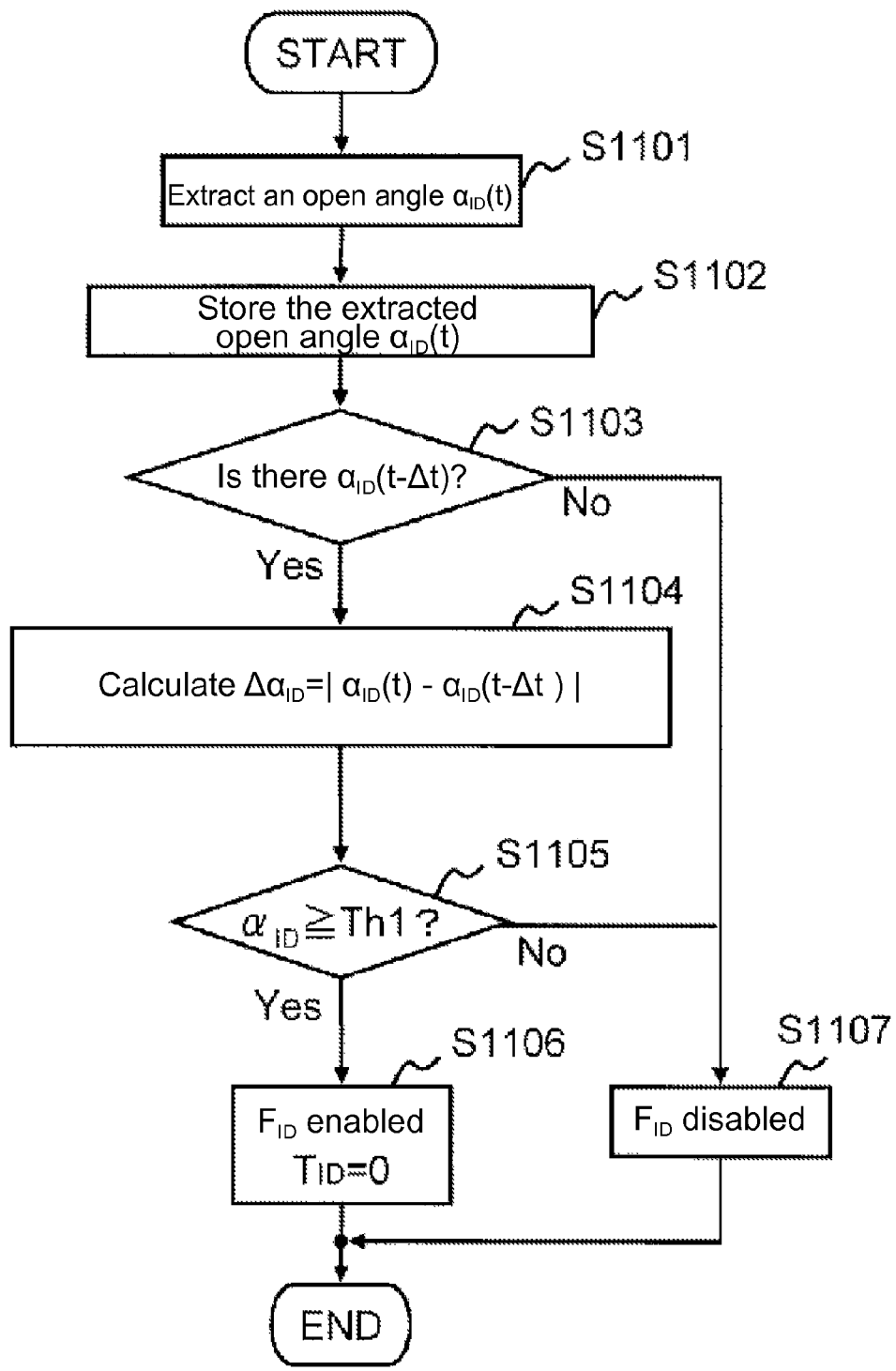
FIG. 5 is a flowchart of a turning detection process of Embodiment 1.

FIG. 5 is a process flow of the turning detection process of this embodiment. As described above, the turning detection unit 220 of this embodiment performs the turning detection process for each vehicle ahead (ID) every time the vehicle ahead positional information assigned with the IDs is sent from the vehicle identification unit 210. Below, the turning detection process for an ID 1 will be explained as an example. Here, the time related to the vehicle ahead positional information assigned with the IDs is represented as a time "t," and an open angle $\alpha ID$ at the time "t" is represented as $\alpha ID(t)$.

First, the turning detection unit 220 extracts an open angle $\alpha ID(t)$, which will be processed, from the vehicle ahead positional information assigned with IDs (step S1101). Thereafter, the turning detection unit 220 assigns the time "t" to the extracted open angle $\alpha ID(t)$, and stores the information in the storage unit 113 (step S1102). Next, the turning detection unit 220 determines whether an open angle $\alpha ID$ (t−Δt) of the previous vehicle detection process (t−Δt) is stored in the storage unit 113 (step S1103).

When $\alpha ID$ (t−Δt) has been stored, the turning detection unit 220 determines a driving status of the vehicle ahead, that is, determines whether the vehicle is making a turn. Specifically, first, the amount of change $\Delta\alpha ID$ in the open angle $\alpha ID$ ($\Delta\alpha ID=|\alpha ID(t)-\alpha ID(t-\Delta t)|$) is derived (step S1104), and thereafter, the turning detection unit 220 determines whether or not the amount of change $\Delta\alpha ID$ in the open angle $\alpha ID$ equals or exceeds the turning threshold Th1 ($\Delta\alpha ID \geq Th1$) (step S1105).

If the amount of change $\Delta\alpha ID$ is equal to or greater than the turning threshold Th1, it is determined that the vehicle having this ID is making a turn, and the turning flag FID that indicates the driving status of this vehicle ahead is enabled (step S1106). The delay time counter TID that counts the delay time DT of this vehicle ahead is also initialized (TID=0). With this, the turning detection process of the vehicle ahead of this ID completes.

On the other hand, when $\alpha ID$ (t−Δt) is not found in the step S1103, or when the amount of change $\Delta\alpha ID$ in the open angle $\alpha ID$ is smaller than the turning threshold Th1 in the step S1105, it is determined that the vehicle ahead having the ID is not making a turn, and the turning flag FID is disabled (FID=0) (step S1107), with which the turning detection process of the vehicle ahead having the ID completes.

The turning detection process by the turning detection unit 220 for the vehicle ahead having the ID 1 has been described above. The turning detection unit 220 of this embodiment performs this turning detection process for each of the vehicles ahead for which the vehicle ahead positional information has been received for and determines the driving status of the respective vehicles at a point in time when the vehicle ahead positional information was captured. By performing this process, the turning detection unit 220 of this embodiment detects, among detected vehicles ahead, a vehicle ahead that is making a turn every time the vehicle ahead positional information is received.

Next, the process for generating the light distribution control signal by the light distribution control unit 230 will be explained. The light distribution control unit 230 receives vehicle ahead information at Δt intervals, and when presence of a vehicle ahead is detected, the light distribution control unit 230 generates a light distribution control signal that controls the headlights to use low beams for an illumination area where the vehicle ahead is present. On the other hand, when vehicle ahead non-detection information is received, the light distribution control unit 230 outputs a light distribution control signal that controls the headlights to illuminate the entire illumination area with high beams. Further, when a vehicle ahead that was determined to be making a turn went into a non-detected state, the light distribution control unit 230 of this embodiment revises the light distribution control signal so that an illumination area that corresponds to a position where that vehicle ahead was last detected is continuously illuminated with low beams for a prescribed delay time.

Specifically, when the vehicle ahead (ID) was making a turn immediately before it turned into a non-detected state, the vehicle ahead information is revised such that for the delay time DT of a prescribed length, the vehicle ahead (ID) is regarded as staying at the position where it was last detected, and based on the revised vehicle ahead information, the light distribution control signal is generated.

Figure 6:
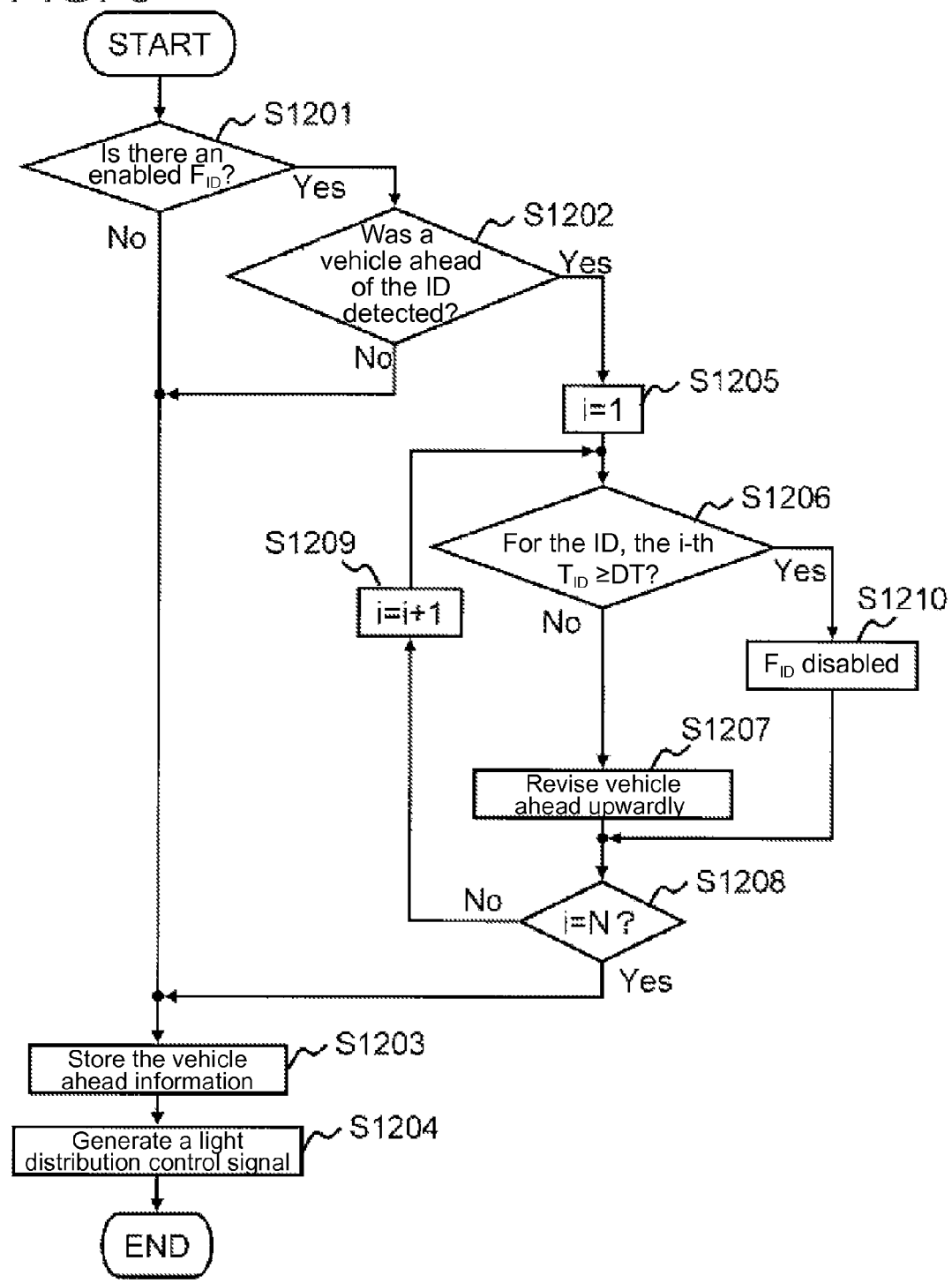
FIG. 6 is a flowchart of a process for generating a light distribution control signal of Embodiment 1.

Next, a flow of the process for generating the light distribution control signal by the light distribution control unit 230 will be explained. FIG. 6 shows a process flow of the process for generating the light distribution control signal of this embodiment. As described above, this process is initiated when the light distribution control unit 230 receives the vehicle ahead information. The time that is associated with the received vehicle ahead information is represented as "t." Also, in the following process, N (N is an integer) indicates the number of non-detected vehicles ahead that have the enabled turning flag IDs FID, and "i" indicates a counter value (an integer).

When the vehicle ahead information is received at the time "t," the light distribution control unit 230 determines the presence or absence of an enabled turning flag FID (step S1201). If the enabled turning flag FID is found in the step S1201, the light distribution control unit 230 refers to the vehicle ahead information at the time "t," and determines whether a vehicle ahead that corresponds to the ID of the enabled turning flag FID was detected (step S1202). In this case, the light distribution control unit 230 determines whether the received vehicle ahead information is the vehicle ahead positional information or the vehicle ahead non-detection information, and when it is the vehicle ahead non-detection information, the light distribution control unit 230 concludes that the vehicle ahead that corresponds to the ID of the enabled turning flag FID is not detected. When the received vehicle ahead information is the vehicle ahead positional information assigned with IDs, the light distribution control unit 230 looks for the same ID as the ID of the enabled turning flag FID. If the same ID is not found, it is determined that the vehicle ahead is not detected, and if the same ID is found, it is determined that the vehicle ahead is detected.

If the enabled turning flag FID is not found, or the vehicle ahead that corresponds to the ID of the enabled turning flag FID has been detected at the time "t," the light distribution control unit 230 stores the received vehicle ahead information in the storage unit 113 (step S1203), and generates a light distribution control signal based on this vehicle ahead information (step S1204).

When the vehicles ahead with the enabled turning flag FID are in the non-detected state, the light distribution control unit 230 determines whether the delay time DT has been passed for all of the vehicles ahead that have the corresponding IDs, and if the time has not passed, the light distribution control unit 230 refers to the vehicle ahead positional information that was stored in the storage unit 113 in the previous cycle (Δt ago), and adds that vehicle ahead positional information of the vehicles ahead having the corresponding IDs to the corresponding vehicle ahead information. Specifically, after the counter "i" ("i" is an integer) is initialized (step S1205), the light distribution control unit 230 determines whether or not delay time counter TID in the i-th cycle has reached the delay time DT for that ID (steps S1206). If TID is smaller than DT, it is determined that the time has not passed, and therefore, the light distribution control unit 230 extracts vehicle ahead positional information of the vehicles ahead having that ID from the vehicle ahead positional information that was used to generate the light distribution control signal last time, and revises the current vehicle ahead information by adding the previous positional information (step S1207). On the other hand, if the delay time DT has passed, the turning flag FID of the ID is disabled (step S1210). After repeating the above-mentioned process N times (steps S1208 and S1209), the process moves to a step S1203.

Through the above-mentioned process, the light distribution control unit 230 of this embodiment performs a light distribution control in accordance with a detection state of a vehicle ahead, and performs a light distribution control such that, when a vehicle ahead was making a turn immediately before it went to a non-detected state, the headlights continue the low-beam illumination to an area where the vehicle ahead was last detected over the prescribed delay time.

Figure 7:
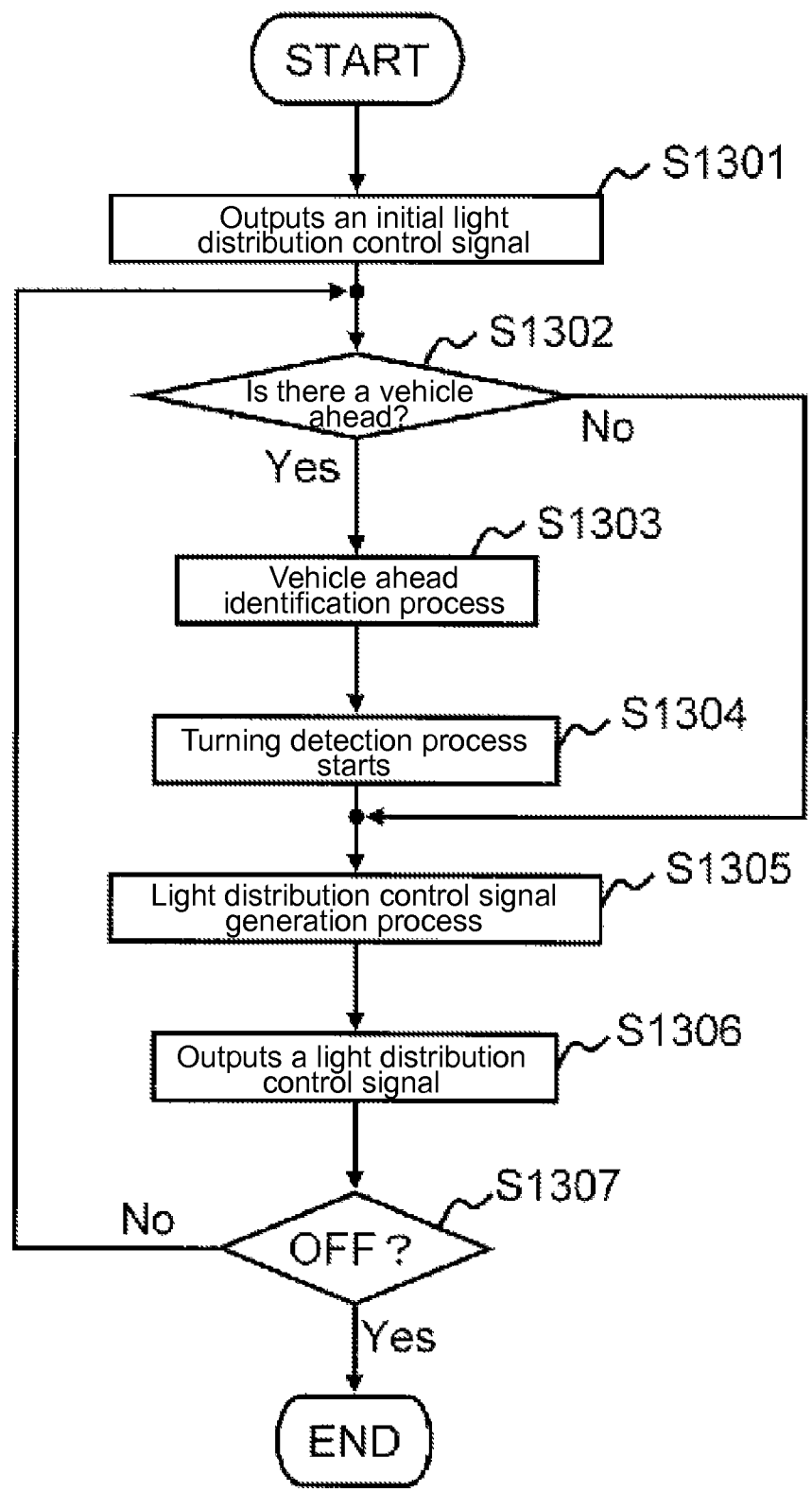
FIG. 7 is a flowchart of a headlight control process of Embodiment 1.

Next, a flow of the headlight control process by the vehicle headlight control unit 200 of this embodiment will be explained. FIG. 7 shows a process flow of the headlight control process of this embodiment. The headlight control process of this embodiment is started when the ADB switch 160 and/or the headlight switch 150 are turned on.

When instructed to start the process, the light distribution control unit 230 first outputs an initial light distribution control signal, thereby making the headlights 130 start an illumination (step S1301), which is a low-beam illumination, for example. Thereafter, the light distribution control unit 230 determines whether or not a vehicle ahead was detected on the basis of the vehicle ahead information received at the Δt intervals (step S1302). In this step, the light distribution control unit 230 determines whether the vehicle ahead information is the vehicle ahead positional information or the vehicle ahead non-detection information. When it is the vehicle ahead positional information, it is determined that a vehicle ahead is detected.

When the vehicle ahead is detected, the vehicle identification unit 210 performs the vehicle ahead identification process for assigning an ID to positional information of each vehicle ahead in the vehicle ahead positional information, thereby generating the vehicle ahead positional information assigned with IDs (step 1303). The resultant vehicle ahead positional information assigned with IDs is output to the turning detection unit 220 and to the light distribution control unit 230. The turning detection unit 220 thereafter starts the turning detection process (step S1304). If it is determined that a vehicle ahead is not detected in the step S1302, the process moves to a step S1305.

When provided with the vehicle ahead positional information assigned with IDs or the vehicle ahead non-detection information, the light distribution control unit 230 performs the process for generating the light distribution control signal (step S1305). The light distribution control unit 230 outputs the resultant light distribution control signal to the headlights 130 (step S1306).

The vehicle headlight control unit 200 repeats the process of receiving vehicle ahead information at $\Delta t$ intervals and generating a light distribution control signal, which corresponds to the steps S1302 through S1306, until either the ADB switch 160 or the headlight switch 150 is turned off (step S1307).

Figure 8:
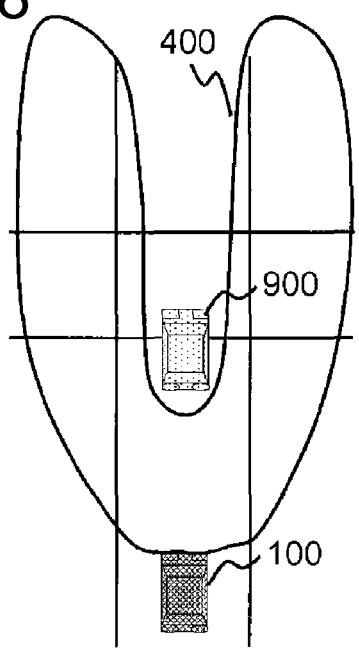
FIGS. 8(a) to 8(c) are explanatory diagrams for illustrating a light distribution control according to Embodiment 1.
FIG. 8(d) is an explanatory diagram for illustrating a conventional light distribution control.
Figure 8:
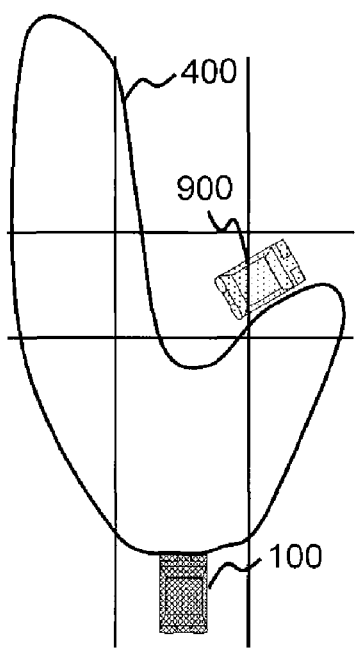
Figure 8:
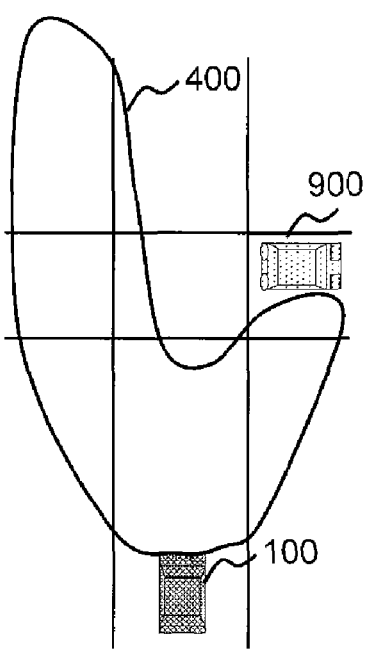
Figure 8:
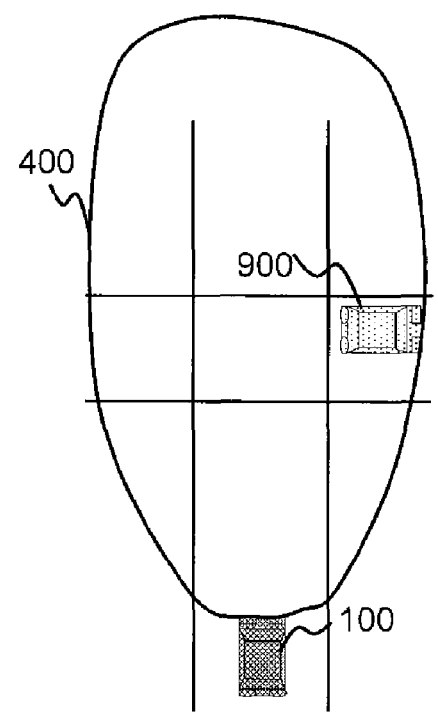

Receiving the light distribution control signal, the headlights 130 perform a low-beam illumination or a high-beam illumination in accordance with the light distribution control signal. When the vehicle ahead 900 is detected only in an area straight ahead of the vehicle 100 (own vehicle), for example, a high-beam illumination area 400 of the headlights 130 becomes as shown in FIG. 8(*a*). When the vehicle ahead 900 is detected only to the right side of the vehicle 100, the high-beam illumination area 400 of the headlights 130 becomes as shown in FIG. 8(*b*). In this case, the vehicle ahead 900 is determined to be making a turn, and therefore, even after the vehicle ahead 900 completes a turn, and goes into a non-detected state, the headlights 130 continue the low-beam illumination to an area where the vehicle ahead 900 was last detected for a prescribed delay time and continues the high-beam illumination in the area 400, as shown in FIG. 8(*c*). In the conventional configuration, when the vehicle ahead 900 turns into a non-detected state, the headlights 130 are immediately switched to the high beams, and therefore, the high-beam illumination area 400 becomes as shown in FIG. 8(*d*).

As described above, the vehicle headlight control unit 200 of this embodiment controls a light distribution of the headlights 130. That is, when a vehicle ahead turns into a non-detected state, the headlights 130 are generally switched to high beams immediately thereafter. However, in this embodiment, even when a vehicle ahead turns into a non-detected state, if the non-detected state is due to a turning motion, the headlights 130 are controlled such that the area where the vehicle ahead was detected is continuously illuminated with the low beams for a prescribed delay time before switched to the high beams.

Therefore, according to this embodiment, when vehicle lights of a vehicle ahead are not detected due to a turning motion such as a right turn, a left turn, or the like, but the driver of the vehicle ahead is still within a high-beam light distribution area of the headlights 130, the headlights 130 are controlled not to illuminate the area with the high beams, which makes it possible to prevent glare to the driver of the preceding vehicle.

That is, a light distribution of the headlights can be appropriately controlled even when the vehicle ahead is making a turn without giving any additional burden on a driver. This can prevent the headlights from causing glare or bothering a driver of a vehicle ahead. Also, because time spent for high-beam illumination is reduced, the power consumption is improved. Furthermore, because low-beam illumination will not be continued unnecessarily, the above-mentioned effects can be achieved without sacrificing the visibility.

Embodiment 2

Next, Embodiment 2 of the present invention will be explained. In Embodiment 1 above, a fixed value is used as the delay time DT that is provided when a vehicle ahead is making a turn. In contrast, in this embodiment, this delay time DT is changed in accordance with the open angle $\alpha$ and/or the speed (own vehicle speed) of the vehicle (own vehicle) 100 immediately before occurrence of the non-detected state.

When a vehicle makes a left or right turn at an intersection or the like, for example, a time required for that vehicle ahead to complete the left or right turn and exit the illumination area of the headlights 130 of the vehicle 100 varies depending on the open angle $\alpha$ immediately before the vehicle ahead turns into a non-detected state. The time required for the vehicle ahead to exit the illumination area of the headlights 130 also varies depending on the speed (own vehicle speed) of the vehicle (own vehicle) 100. Therefore, in this embodiment, the delay time DT is changed in accordance with at least one of the open angle $\alpha$ and the own vehicle speed.

Basic configurations of the vehicle 100 and the vehicle headlight control unit 200 of this embodiment are similar to those of Embodiment 1. Below, the explanation of this embodiment will be made mainly for the structures that differ from those of Embodiment 1.

Figure 9:
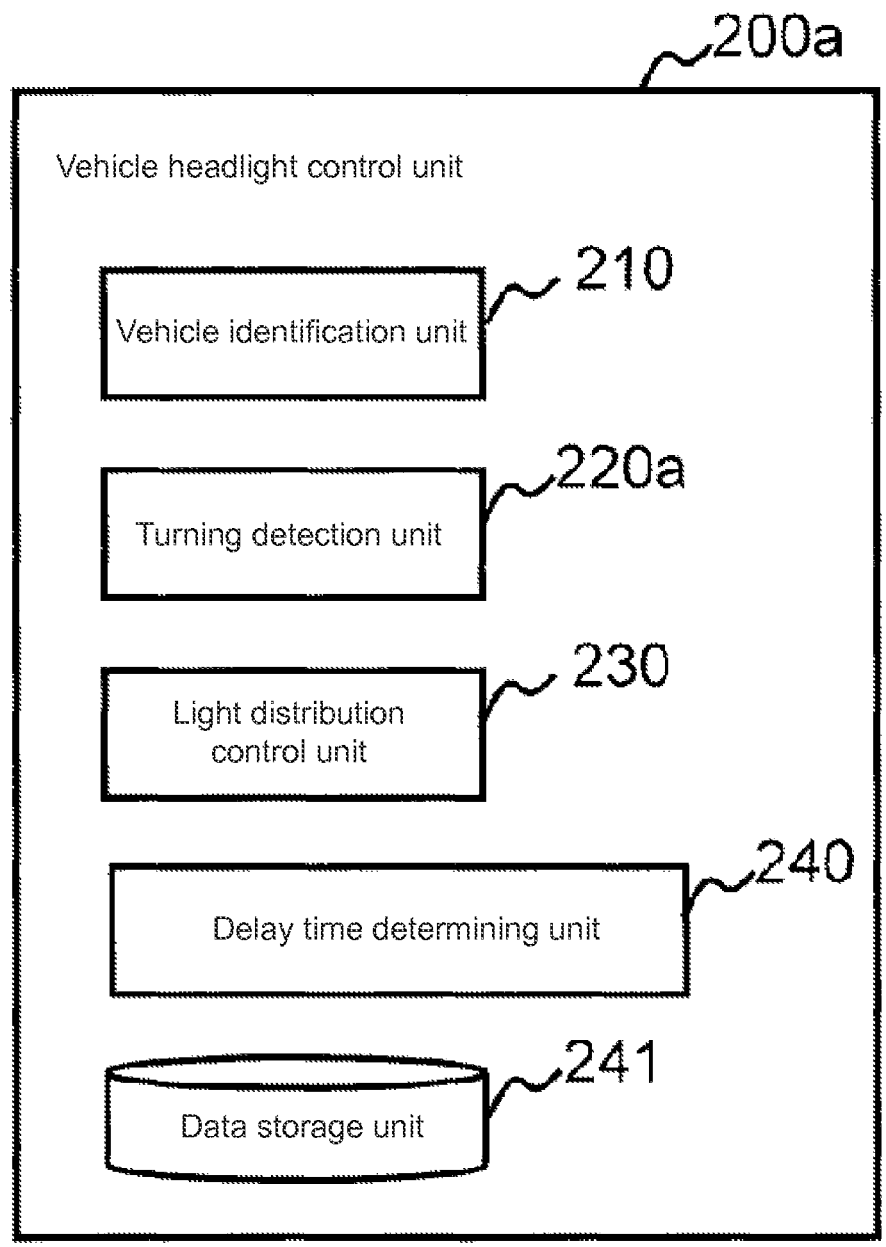
FIG. 9 is a function block chart of a vehicle headlight control unit of Embodiment 2.

FIG. 9 is a function block diagram of a vehicle headlight control unit 200*a* of this embodiment. As shown in the figure, the vehicle headlight control unit 200*a* of this embodiment includes a vehicle identification unit 210 and a light distribution control unit 230 in a manner similar to Embodiment 1. As described above, because the delay time DT is variable in this embodiment, instead of the turning detection unit 220 of Embodiment 1, a turning detection unit 220*a* is provided. The vehicle headlight control unit 200*a* also includes a delay time determining unit 240 that determines the delay time DT, and a data storage unit 241 that stores data provided for determining the delay time DT.

In a manner similar to Embodiment 1, functions of the respective units are performed by the CPU in the calculation unit 111 in the ECU 110, which loads programs stored in the storage unit 113 to the memory 112 and executes them. The data storage unit 241 is provided in the storage unit 113.

When the amount of change $\Delta \alpha$ID in the open angle $\alpha$ID is equal to or greater than the turning threshold Th1, the turning detection unit 220*a* of this embodiment sends the ID and the open angle $\alpha$ to the delay time determining unit 240. Receiving such information, the delay time determining unit 240 determines a delay time DTID of the ID at that point in accordance with prescribed conditions, and thereafter sends the determined delay time DTID to the light distribution control unit 230.

Figure 10:
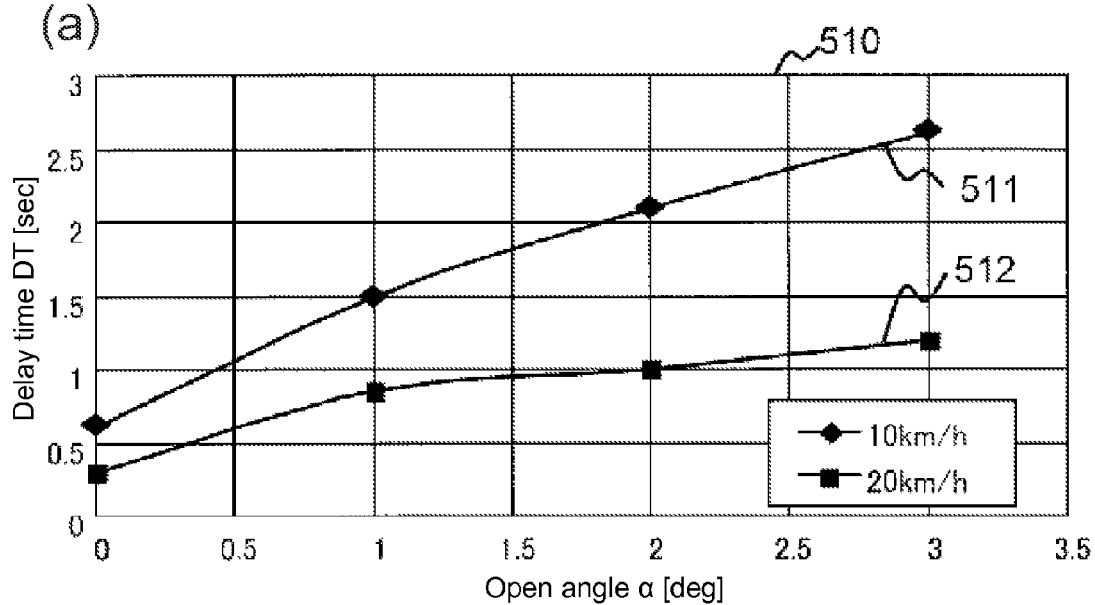
FIGS. 10(a) and 10(b) are delay time graphs according to Embodiment 2.
Figure 10:
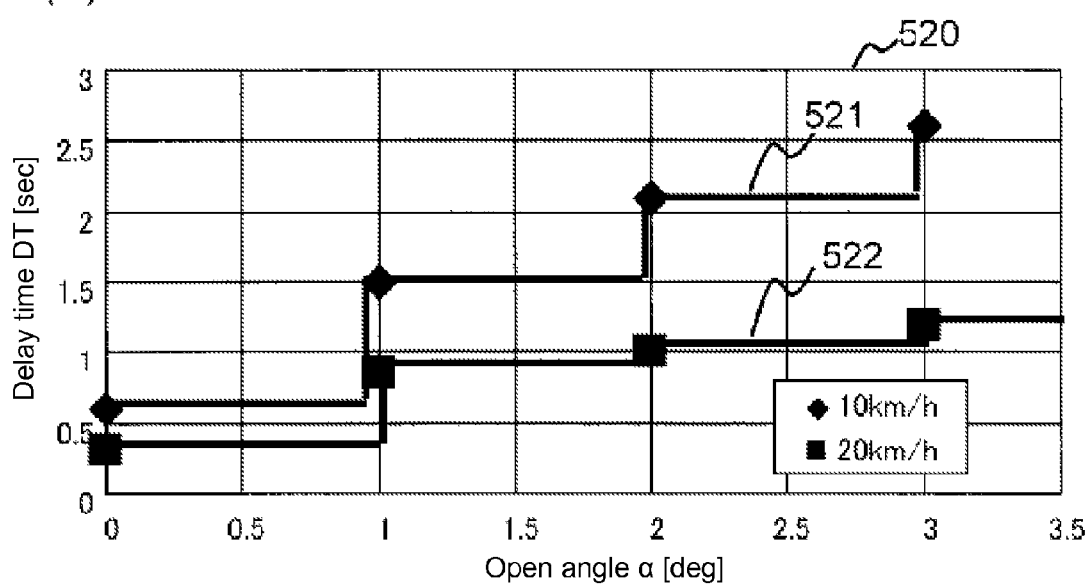

In determining the delay time DTID from the open angle $\alpha$ID, a delay time graph 510 as shown in FIG. 10(*a*) is employed, for example. In the delay time graph 510, which is stored in the data storage unit 241 in advance, the delay time DT (sec) is dependent on the open angle $\alpha$ (deg) and/or the own vehicle speed (km/h). The delay time graph 510 may be a single graph that is used regardless of the own vehicle speed, or may be a plurality of graphs prepared for different speeds of the own vehicle.

The delay time may also be determined by the own vehicle speed alone without using the open angle $\alpha$. In this case, a graph of the delay time that varies in accordance with the own vehicle speed is prepared. When the delay time is determined independently from the open angle α, the delay time determining unit 240 does not need to receive the ID information from the turning detection unit 220a, and in this case, the turning detection unit 220a may send the ID information to the light distribution control unit 230 when the light distribution control unit 230 performs a process of determining whether or not the delay time has passed.

FIG. 10(a) shows an example where the delay time graph 510 includes a graph 511 for the own vehicle speed of 10 km/h and a graph 512 for the own vehicle speed of 20 km/h.

The data provided for determining the delay time DTID is not limited to the delay time graph 510 shown in FIG. 10(a). An approximation formula representing the graph shown in FIG. 10(a) may be stored in the data storage unit 241, for example.

The delay time graph stored in the data storage unit 241 is also not limited to a graph that changes linearly as shown in FIG. 10(a), and may be a stepwise graph (delay time graph) 520 shown in FIG. 10(b). FIG. 10(b) shows an example of the delay time graph 520, and includes a graph 521 for the own vehicle speed of 10 km/h and a graph 522 for the own vehicle speed of 20 km/h in a manner similar to FIG. 10(a). Alternatively, values that can be obtained from the graph in FIG. 10(b) may be stored as a table.

Figure 11:
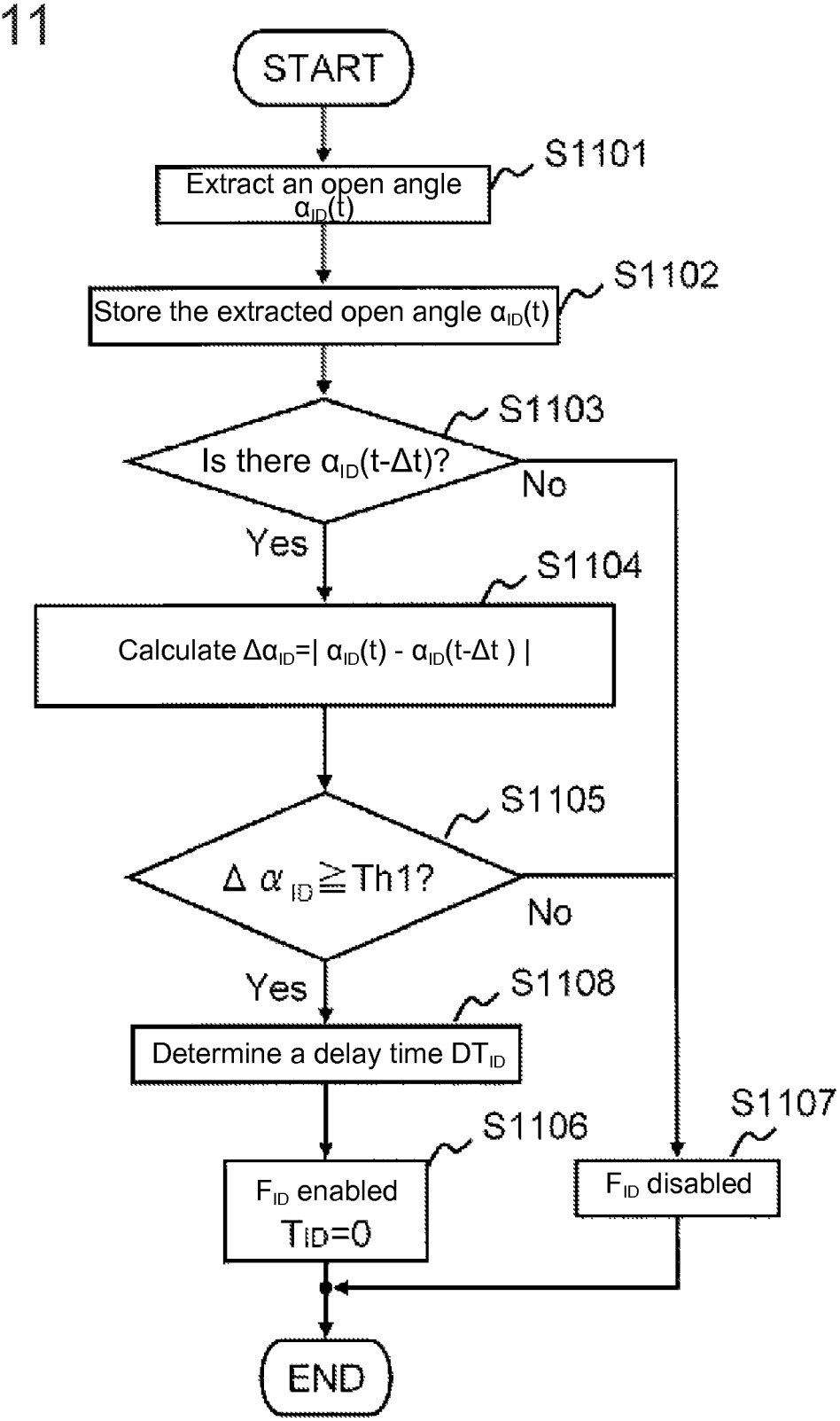
FIG. 11 is a flowchart of a turning detection process of Embodiment 2.

FIG. 11 is a process flow of the turning detection process by the turning detection unit 220a that includes a delay time determining process by the delay time determining unit 240 of this embodiment. In this embodiment as well, the process performed for a particular ID will be described. Steps through the step S1105 and steps through the step S1107 are similar to those of Embodiment 1 above. In this embodiment, in the step S1105, when the amount of change ΔαID in the open angle αID is equal to or greater than the turning threshold Th1, the turning detection unit 220a sends the ID and the open angle αID to the delay time determining unit 240.

Receiving such information, the delay time determining unit 240 determines the delay time DTID of the ID (step S1108) by using data stored in the data storage unit 241, and the determined delay time DTID is sent to the light distribution control unit 230. When the own vehicle speed is also taken into account, the delay time determining unit 240 determines the delay time DTID based on the vehicle speed, which is received from the vehicle speed sensor 140, in addition to the open angle αID.

Thereafter, the turning detection unit 220a enables the turning flag FID, and initializes the delay time counter TID (step S1106) in a manner similar to Embodiment 1, thereby completing the process.

The process for generating a light distribution control signal by the light distribution control unit 230 is performed in a manner similar to Embodiment 1, except that a delay time that is used in the step S1206 is the delay time DTID determined by the delay time determining unit 240. The headlight control process by the vehicle headlight control unit 200a is also performed in a manner similar to that of Embodiment 1.

As described above, in a manner similar to Embodiment 1, the vehicle headlight control unit of this embodiment controls the headlights such that, even when a vehicle ahead was not detected, if the vehicle ahead was making a turn immediately before it turned into the non-detected state, the headlights continue the low-beam illumination to an area where the vehicle ahead was last detected until after the prescribed delay time has passed, and then thereafter switch to high beams. Therefore, in a manner similar to Embodiment 1, it becomes possible to prevent glare that dazzles a driver of the vehicle ahead, which went into the non-detected state due to a left or right turn.

Further, according to this embodiment, the delay time before the start of the high-beam illumination is controlled based on at least one of the open angle of the vehicle ahead and the own vehicle speed. This makes it possible to control the delay time more accurately, achieving a further reduction in the undesired power consumption without sacrificing the visibility.

In the respective embodiments, the delay time DT is not dependent on a direction of turn, but it may be configured so as to be changed in accordance with the direction of turn. Generally, the vehicle ahead 900 exits the illumination area of the headlights 130 of the vehicle 100 in a shorter period of time when it turns to the right side (right side turn) as viewed from the own vehicle 100 as compared with turning to the left side (left side turn).

Therefore, if the delay time DT is to be fixed as in Embodiment 1, different fixed delay times DT are provided in advance for the left side turn and for the right side turn, respectively. In the case of Embodiment 2, two kinds of graphs, which are a delay time graph for the right side turn and a delay time graph for the left side turn, are stored in the data storage unit 241 as the delay time graphs that vary in accordance with at least one of the open angle α of the previous detection cycle and the own vehicle speed.

Figure 12:
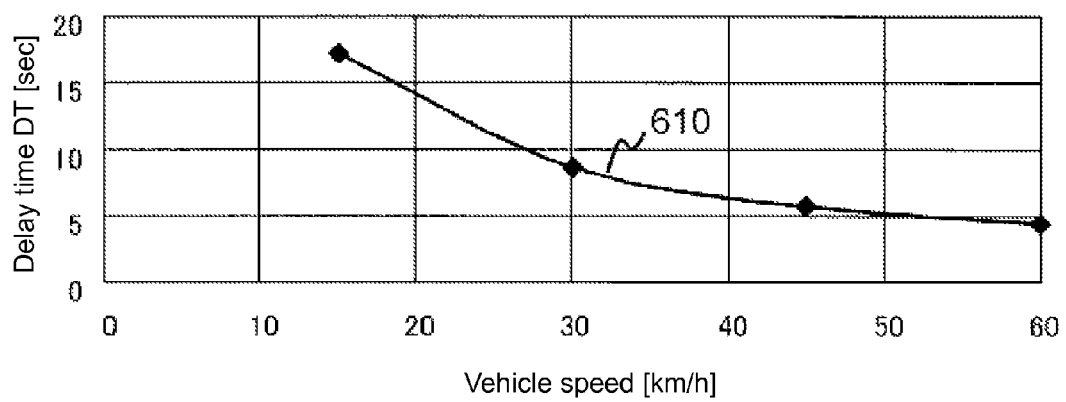
FIG. 12(a) is a right turn delay time graph for a modification example of Embodiment 2.
FIG. 12(b) is a left turn delay time graph for a modification example of Embodiment 2.
Figure 12:
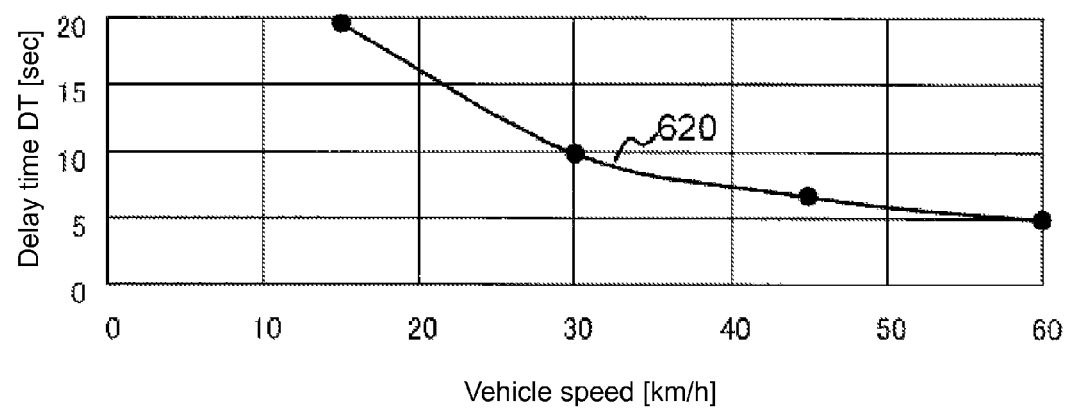

FIG. 12 show examples of graphs for the delay time DT (sec) that varies in accordance with the own vehicle speed (km/h). FIG. 12(a) is an example of a delay time graph for the right side turn 610, and FIG. 12(b) is an example of a delay time graph for the left side turn 620.

Whether a turning motion is the right side turn or the left side turn is determined in the basis of a location of the turning motion in the image of the preceding area, for example. In accordance with this result, the turning detection unit 220 or the delay time determining unit 240 determines the delay time DT (or DTID), which is then sent to the light distribution control unit 230. The type of the turning motion may also be determined based on the angles included in the vehicle ahead positional information. That is, the moving direction of a vehicle can be determined by monitoring a change of the angle for respective IDs, for example.

With this configuration, the area and duration of the low-beam illumination can be minimized with a higher degree of accuracy, and therefore, it becomes possible to be considerate to other vehicles without sacrificing the visibility, thus making possible the early detection of pedestrians as well as the improvement in the long distance visibility.

The respective embodiments above are configured to start the process of detecting a turning motion of a vehicle ahead and revising the vehicle ahead information, which becomes a basis of the light distribution control signal, when at least one of the ADB switch 160 and the headlights switch 150 is turned on, but the present invention is not limited to such. It can be configured that this process starts when the recognition camera 120 starts sending the recognition results, and continues always thereafter.

The respective embodiments above are configured such that, when a vehicle ahead that was determined to be making a turn is no longer detected, the vehicle ahead information thereof is revised, and the revised information is reflected to the light distribution control signal for a prescribed delay time. However, the present invention is not limited to such, and a control signal for directing the headlights to maintain the low-beam illumination to the corresponding area may be output to the headlights 130.

Further, in the respective embodiments above, the recognition camera 120 performs a series of processes up to the calculation of the open angle (angle information) of each vehicle ahead when vehicles ahead are detected, but the present invention is not limited to such. It is also possible to employ a configuration where the recognition camera 120 only captures image information of a preceding area, and the vehicle headlight control unit performs a vehicle ahead detection based on the image.

DESCRIPTION OF REFERENCE CHARACTERS

100 vehicle
110 ECU
111 calculation unit
112 memory
113 storage unit
120 recognition camera
130 headlight
140 vehicle speed sensor
150 headlight switch
160 ADB switch
200 vehicle headlight control unit
200a vehicle headlight control unit
210 vehicle identification unit
220 turning detection unit
220a turning detection unit
230 light distribution control unit
240 delay time determining unit
241 data storage unit
310 graph
320 graph
330 graph
400 illumination area
510 delay time graph
511 graph
512 graph
520 delay time graph
521 graph
522 graph
610 delay time graph for right side turn
620 delay time graph for left side turn
900 vehicle ahead

The invention claimed is:

1. A vehicle headlight control device that detects a vehicle present in a preceding area of an own vehicle at prescribed intervals through a recognition camera and that controls a light distribution of a vehicle headlight in accordance with a detection result, the vehicle headlight control device comprising:
a vehicle identification unit that identifies, upon detection of a vehicle ahead, the vehicle ahead that has been detected;
a turning detection unit that detects a turning motion of each said identified vehicle ahead; and
a light distribution control unit that generates a light distribution control signal for controlling the light distribution of the vehicle headlight,
wherein the light distribution control unit generates the light distribution control signal for controlling the vehicle headlight such that the vehicle headlight is instructed to perform a low-beam illumination to an area where the vehicle ahead is detected and perform a high-beam illumination to a non-detection area, and such that the low-beam illumination is maintained for a prescribed delay time with respect to a non-detection area where an vehicle ahead was determined to be making a turn immediately before turning into a non-detected state.

2. The vehicle headlight control device according to claim 1, wherein, when the vehicle ahead is detected, the recognition camera outputs, as the detection result, an angle at which the vehicle is detected and an open angle for each detected vehicle ahead,
wherein the vehicle identification unit identifies the vehicle ahead based on the angle at which the vehicle is detected, and
wherein the turning detection unit detects a turning motion when a temporal change in the open angle satisfies a prescribed condition.

3. The vehicle headlight control device according to claim 1, further comprising a delay time determining unit that determines the delay time, wherein the delay time determining unit determines the delay time in accordance with at least one of the open angle and a speed of the own vehicle.

4. The vehicle headlight control device according to claim 2, further comprising a delay time determining unit that determines the delay time, wherein the delay time determining unit determines the delay time in accordance with at least one of the open angle and a speed of the own vehicle.

5. The vehicle headlight control device according to claim 1, wherein the turning detection unit determines whether the turning motion of the vehicle ahead is a right side turn or a left side turn, and
wherein the delay time is set differently for the right side turn and for the left side turn.

6. The vehicle headlight control device according to claim 2, wherein the turning detection unit determines whether the turning motion of the vehicle ahead is a right side turn or a left side turn, and
wherein the delay time is set differently for the right side turn and for the left side turn.

7. A vehicle headlight system, comprising:
the vehicle headlight control device according to claim 5; and
a vehicle headlight that is controlled by the vehicle headlight control device to adjust a light distribution.

8. A vehicle headlight system, comprising:
the vehicle headlight control device according to claim 6; and
a vehicle headlight that is controlled by the vehicle headlight control device to adjust a light distribution.

* * * * *